United States Patent
Mraz et al.

(10) Patent No.: US 9,853,918 B2
(45) Date of Patent: Dec. 26, 2017

(54) ONE-WAY NETWORK INTERFACE

(71) Applicant: Owl Computing Technologies, Inc., Ridgefield, CT (US)

(72) Inventors: Ronald Mraz, South Salem, NY (US); Robert M Zucker, Brewster, NY (US); Steven Staubly, Newtown, CT (US)

(73) Assignee: Owl Cyber Defense Solutions, LLC, Ridgefield, CT (US)

( * ) Notice: Subject to any disclaimer, the term of this patent is extended or adjusted under 35 U.S.C. 154(b) by 122 days.

(21) Appl. No.: 14/666,508

(22) Filed: Mar. 24, 2015

(65) Prior Publication Data

US 2016/0285786 A1  Sep. 29, 2016

(51) Int. Cl.
*H04L 12/935* (2013.01)
*H04L 12/64* (2006.01)

(52) U.S. Cl.
CPC .......... *H04L 49/30* (2013.01); *H04L 12/6418* (2013.01)

(58) Field of Classification Search
CPC . H04B 10/1121; H04B 10/1141; H04L 49/03; H04L 12/2898; H04L 1/0033; H04L 7/0079; H04L 7/0091; H04L 15/04; H04L 15/24; H04L 17/02; H04L 17/16; H04L 5/16
See application file for complete search history.

(56) References Cited

U.S. PATENT DOCUMENTS

| | | |
|---|---|---|
| 5,703,562 A | 12/1997 | Nilsen |
| 7,675,867 B1 | 3/2010 | Mraz et al. |
| 7,941,526 B1 | 5/2011 | Hope et al. |
| 7,992,209 B1 | 8/2011 | Menoher et al. |
| 8,068,415 B2 | 11/2011 | Mraz |
| 8,139,581 B1 | 3/2012 | Mraz et al. |
| 8,266,689 B2 | 9/2012 | Menoher et al. |
| 8,352,450 B1 | 1/2013 | Mraz et al. |
| 8,353,022 B1 | 1/2013 | Menoher et al. |
| 8,498,206 B2 | 7/2013 | Mraz |
| 8,516,580 B2 | 8/2013 | Menoher |

(Continued)

OTHER PUBLICATIONS

PCT International Search Report and Written Opinion for Application No. PCT/US16/21786 dated Jun. 9, 2016.

*Primary Examiner* — Benjamin H Elliott, IV
(74) *Attorney, Agent, or Firm* — Economou Silfin LLP; John S. Economou

(57) ABSTRACT

Two embodiments of a one-way network interface card are disclosed, a transmit-only version and a receive-only version. A network controller mounted on the circuit card is coupled to the host computer via a host computer interface. A first processor is coupled to a network interface of the network controller. A second processor has a separate network interface for communicating with a remote computer. A one-way link is coupled between the first processor and the second processor. For the transmit-only embodiment, the one-way link only allows information to be transferred from the first processor to the second processor, and thus information may only pass from the host computer to the remote computer. For the receive-only embodiment, the one-way link only allows information to be transferred from the second processor to the first processor, and thus information may only pass from the remote computer to the host computer.

6 Claims, 2 Drawing Sheets

(56) References Cited

U.S. PATENT DOCUMENTS

| | | |
|---|---|---|
| 8,565,237 B2 | 10/2013 | Mraz et al. |
| 8,646,094 B2 | 2/2014 | Staubly |
| 8,732,453 B2 | 5/2014 | Mraz et al. |
| 8,776,254 B1 | 7/2014 | Mraz et al. |
| 8,831,222 B2 | 9/2014 | Menoher et al. |
| 8,887,276 B2 | 11/2014 | Mraz et al. |
| 8,898,227 B1 | 11/2014 | Mraz et al. |
| 2005/0174996 A1* | 8/2005 | Hara ............... H04L 12/4625 370/352 |
| 2009/0230255 A1 | 9/2009 | Lemonovich et al. |
| 2010/0127193 A1 | 5/2010 | Abernathy et al. |
| 2011/0153969 A1 | 6/2011 | Petrick |
| 2012/0030768 A1 | 2/2012 | Mraz et al. |
| 2012/0162697 A1 | 6/2012 | Mraz et al. |
| 2013/0254878 A1 | 9/2013 | Mraz et al. |
| 2014/0020109 A1 | 1/2014 | Mraz et al. |
| 2014/0089388 A1 | 3/2014 | Curry et al. |
| 2014/0136657 A1 | 5/2014 | Mraz |
| 2014/0139737 A1 | 5/2014 | Clarke et al. |
| 2014/0165182 A1 | 6/2014 | Curry et al. |
| 2014/0207939 A1 | 7/2014 | Mraz et al. |
| 2014/0208420 A1 | 7/2014 | Mraz et al. |
| 2014/0237372 A1 | 8/2014 | Mraz et al. |
| 2014/0237561 A1 | 8/2014 | Mraz |
| 2014/0304371 A1 | 10/2014 | Mraz et al. |
| 2016/0285786 A1* | 9/2016 | Mraz ..................... H04L 45/04 |

* cited by examiner

ONE-WAY NETWORK INTERFACE

FIELD

This disclosure relates generally to a one-way cross-domain solution included on a network interface card.

BACKGROUND

A cross-domain solution (CDS) is a system that provides the ability to access or transfer data between two networks having differing security domains or between a computer in one security domain and a network in another security domain. A CDS may be one-way only (from a low to a high domain or from a high to a low domain) or may be two-way. For a one-way CDS linking two networks, highly engineered solutions, such as the Owl Computing Technologies® Dual Diode, provide a direct point-to-point optical link between the two networks having differing security domains (with data transfer in either the low-to-high direction or in the low-to-high direction). The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode because the optical link, which is the only physical channel for communications, can only carry information in a single direction since there is no receiving circuit coupled to the transmit end of the optical link and no transmitting circuit coupled to the receive end of the optical link.

Typically, the computing platforms coupled to a network are personal computers or workstations. When implementing a one-way data transfer system from a send node coupled to a first network to a receive node coupled to a second network, to achieve and maintain the unidirectionality of data flow over a one-way optical data link coupling the send node to the receive node, the personal computer at the send node must be configured so that only an optical transmitter coupled to the send node interfaces to a first end of a one-way optical data link (e.g., an optical fiber) and, on the other hand, the personal computer at the receive node must be configured so that only an optical receiver coupled to the receive node interfaces to a second opposite end of the one-way optical data link. As disclosed in U.S. Pat. No. 8,068,415 B2 to Mraz ("the '415 patent"), one solution is to provide a transmit-only interface card in the personal computer at the send node and a receive-only interface card in the personal computer at the receive node, with an optical fiber coupling the transmit-only interface card to the receive-only interface card. In this situation, the transmit-only interface card does not include any receive circuitry and thus is capable only of transmitting information while the receive-only interface card does not include any transmit circuitry and thus is capable only of receiving information. The system disclosed in the '415 patent thus requires two personal computers or servers. In this configuration, a first personal computer or server is located on the send side and includes a network interface card coupled to the send side network and a transmit-only interface card coupled to the send side of an optical fiber. Also, a second personal computer or server is located on the receive side and includes a network interface card coupled to the receive side network and a receive-only interface card coupled to the receive side of an optical fiber. The requirement for using two personal computers or servers for the cross-domain system is less than optimal.

Accordingly, there is a need for a cross-domain system which overcomes the problems identified above.

SUMMARY

In one aspect, a transmit-only network interface card for a host computer is provided. The transmit-only network interface includes a single printed circuit card configured to be mounted in the host computer. Also, a network controller is mounted on the single printed circuit card. The network controller is coupled to the host computer via a host computer interface and has a network interface. A source processor is mounted on the single printed circuit card. The source processor is coupled to the network interface of the network controller and is configured to forward information received from the network interface on a separate output. A one-way data link is mounted on the single printed circuit card. The one-way data link has an input coupled to the separate output of the source processor and an output. The one-way data link is configured to transfer data only from the input to the output and to prevent any signal from passing from the output to the input. A destination processor is mounted on the single printed circuit card. The destination processor has an input coupled to the output of the one-way data link and a network interface. The destination processor is configured to forward information received on the input to a remote computer via the network interface.

In a further aspect, the transmit-only interface card may also include an external power interface. The destination processor may be coupled to an external power interface to receive power such that the destination processor only receives power via the external power interface. The single printed circuit board may have three separate contiguous areas, a first area containing the destination processor, a second area containing the network controller and the source processor and a third area disposed directly between the first area and the second area. In this case, the third area will contain no electrical connections between the first area and the second area and the one-way data link will span the third area with the input thereof within the second area and the output thereof within the first area.

In another aspect, a receive-only network interface card for a host computer is provided. The receive-only network interface card includes a single printed circuit card configured to be mounted in the host computer. A network controller is mounted on the single printed circuit card. The network controller is coupled to the host computer via a host computer interface and has a network interface. A destination processor is mounted on the single printed circuit card. The destination processor has a separate input and is coupled to the network interface of the network controller. The destination processor is configured to forward information received on the separate input to the network interface. A one-way data link is mounted on the single printed circuit card. The one-way data link has an input and an output coupled to the separate input of the destination processor. The one-way data link is configured to transfer data only from the input to the output and to prevent any signal from passing from the output to the input. A source processor is mounted on the single printed circuit card. The source processor has a network interface and an output coupled to the input of the one-way data link. The source processor is configured to forward information received from a remote computer via the network interface on the output.

In a further aspect, the receive-only network interface card may also include an external power interface. The source processor may be coupled to the external power interface to receive power such that the source processor only receives power via the external power interface. The single printed circuit board may have three separate contiguous areas, a first area containing the source processor, a second area containing the network controller and the destination processor and a third area disposed directly between the first area and the second area. In this case, the third area will contain no electrical connections between the first area and the second area and the one-way data link will span the third area with the input thereof within the first area and the output thereof within the second area.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION

In the present disclosure, like reference numbers refer to like elements throughout the drawings, which illustrate various exemplary embodiments of the present invention.

Figure 1:
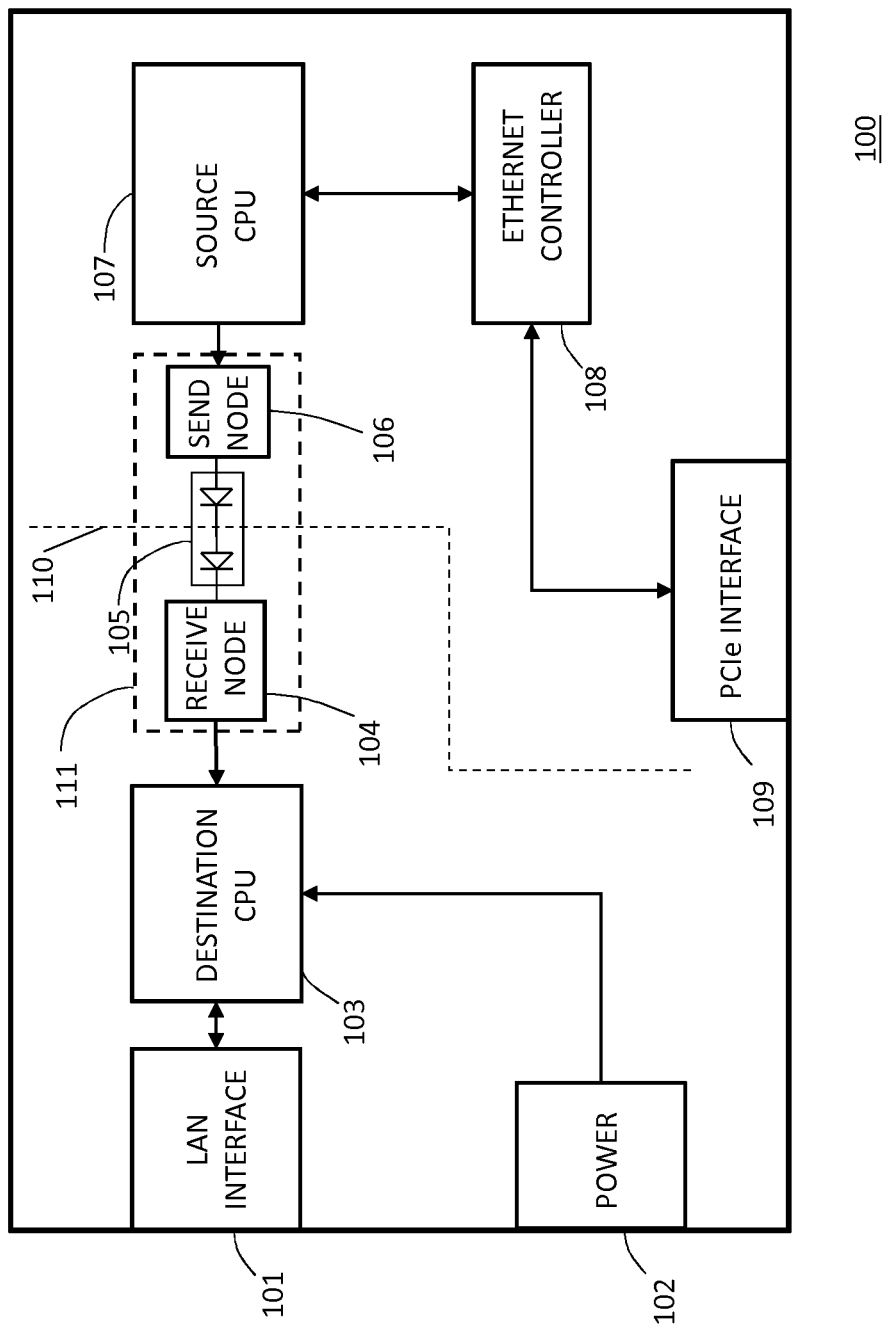
FIG. 1 is a block diagram of a one-way transmit-only network interface card according to the present disclosure.

Referring now to the drawings, and in particular to FIG. 1, a one-way transmit-only network interface card 100 includes a LAN interface 101 and a power interface 102 which are both coupled to a destination CPU 103. LAN interface 101 is used to couple to a local area network and may be, for example, an RJ-45 socket with appropriate electrical connections. Power interface 102 may include, for example, any conventional connector and is used to provide power for destination CPU 103. As one of ordinary skill in the art may readily recognize, the externally provided power source may be a conventional wall plug with an integrated transformer and also include any necessary voltage regulation circuits, or the required power regulation circuits may instead be included within power interface 102. External power is provided to destination CPU 103 to maintain separation of the transmit and receive circuits across boundary 110, as discussed below. Destination CPU 103 may include an integrated Ethernet controller for managing communications with a LAN coupled via LAN interface 101 or a separate Ethernet controller (not shown) may be coupled between LAN interface 101 and destination CPU 103.

The one-way transmit-only network interface card 100 also includes a PCIe interface 109 for coupling to a host computer's internal expansion bus. Although a PCIe interface 109 is shown in FIG. 1, as one of ordinary skill in the art will readily recognize, in alternative embodiments, interface 109 may be alternatively configured for connection to any other type of computer expansion bus. PCIe interface 109 is coupled to an Ethernet controller 108, which in turn, is coupled to source CPU 107 via an integrated Ethernet controller. In a presently preferred embodiment, Ethernet controller 108 communicates with source CPU 107 using Ethernet protocol. As with the destination CPU 103, the integrated Ethernet controller in source CPU 107 may alternatively be provided as a separate integrated circuit (not shown) provided between Ethernet controller 108 and source CPU 107.

Source CPU 107 is coupled to destination CPU 103 via a one-way transfer system 111. One-way transfer system 111 may comprise, for example, a send node 106, a one-way data link 105, and a receive node 104. The one-way data link 105 may comprise, for example, an optocoupler-type device having an input coupled to send node 106 and an output coupled to the receive node 104. In the alternative, one-way data link 105 may consist of discrete components such as an LED coupled to a photocoupler via an optical fiber, with the LED coupled to an output of the send node 106 and the photocoupler coupled to an input of the receive node 104.

To ensure secure communications, the various components on one-way transmit-only network interface card 100 are mounted so that all the transmit-side components are on a first side of boundary line 110 (e.g., to the right of line 110) and all the receive-side components are on a second opposite side of boundary line 110 (e.g., to the left of line 110). No circuit board traces cross boundary line 110 and the only component that crosses boundary 110 is one-way data link 105. For example, when the one-way data link 105 is an optocoupler device, the input pins of the optocoupler device are mounted on the right side of boundary 110 and the output pins of that device are mounted on the left side of boundary 110. In another example, when the one-way data link 105 is formed from discrete components, the LED is mounted on the right side of boundary 110, the photocoupler is mounted on the left side of boundary 110 and the optical fiber crosses the boundary 110. In effect, boundary line 110 consists of an area of empty space on network interface card 100 between the area in which the transmit-side components mounted and the area in which the receive-side components mounted. No electrical conductors pass across the area of empty space forming boundary line 110 such that the one-way data link is the only way to communicate from the transmit-side components to the receive-side components.

In operation, the transmit-only network interface card 100 shown in FIG. 1 allows the host computer to communicate with the source CPU 107 directly, e.g., via Ethernet protocol, and likewise allows destination CPU 103 to communicate with remote computers (not shown) via an external network (also not shown) using, for example, Ethernet protocol. In particular, the host computer may send TCP/IP packets to a TCP client proxy running on source CPU 107, which are then transferred to destination CPU 103 via the one-way transfer system 111 (preferably without the IP information), and a preconfigured TCP server proxy running on destination CPU 103 may then send the TCP/IP packets to a predetermined remote computer (based on the preconfiguration). This process of TCP communications across a one-way data link is detailed in U.S. Pat. No. 8,139,581 B1 ("the '581 patent"), which is incorporated by reference in its entirety herein, and ensures that information may only pass from source CPU 107 to destination CPU 103 and that no information or signals of any kind pass from destination CPU 103 to source CPU 107. In one alternative communication methodology, the host computer may send UDP packets to a UDP socket of the Ethernet port of source CPU 107 for transmission across one-way transfer system 111 and ultimately to a remote computer via destination CPU 103. This process is also described in more detail in the '581 patent. System 100 may also implement combined UDP/TCP communications as described in the '581 patent. A number of other communication methodologies may also be implemented, either in conjunction with TCP and/or UDP or in the alternative to UDP and/or UDP, including but not limited to the following services provided by Owl Computing Technologies, Inc.: Secure File/Directory Transfer System (DFTS); Remote File Transfer Service (RFTS), Secure Network Transfer Service (SNTS); and Remote Printing Transfer Service (RPTS).

Figure 2:
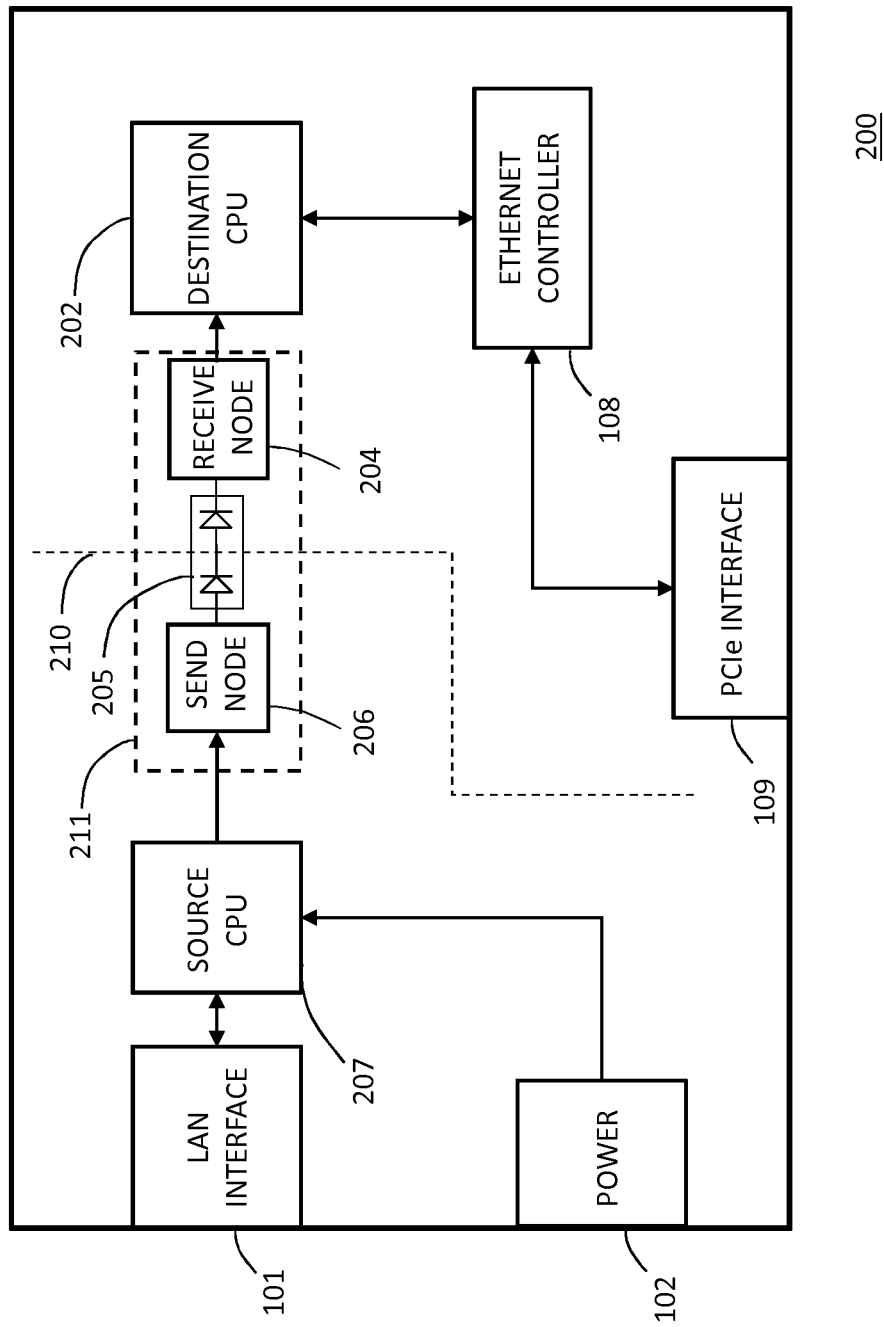
FIG. 2 is a block diagram of a one-way receive-only network interface card according to the present disclosure.

Referring now to FIG. 2, in an alternative embodiment, a one-way receive-only network interface card 200 includes a LAN interface 101 and a power interface 102 which are both coupled to a source CPU 207. Power interface 102 provides power for source CPU 207 in the same manner as power interface 102 in FIG. 1. External power is provided to source CPU 207 to maintain separation of the transmit and receive circuits across boundary 210, as discussed below. Source CPU 207 may include an integrated Ethernet controller for managing communications with a LAN coupled via LAN interface 101 or a separate Ethernet controller (not shown) may be coupled between LAN interface 101 and source CPU 207.

The one-way receive-only network interface card 200 also includes a PCIe interface 109 for coupling to a host computer's internal expansion bus. As with the FIG. 1 embodiment, although a PCIe interface 109 is shown in FIG. 2, as one of ordinary skill in the art will readily recognize, the network interface cards of instant disclosure can be applied to any type of computer expansion bus adapted to receive expansion cards by providing the appropriate interface and connector. PCIe interface 109 is coupled to an Ethernet controller 108, which in turn, is coupled to destination CPU 202 via an integrated Ethernet controller. In a presently preferred embodiment, Ethernet controller 108 communicates with destination CPU 202 using Ethernet protocol. As with the source CPU 207, the integrated Ethernet controller in destination CPU 202 may alternatively be provided as a separate integrated circuit (not shown) provided between Ethernet controller 108 and destination CPU 202.

Source CPU 207 is coupled to destination CPU 202 via a one-way transfer system 211. One-way transfer system 211 may comprise, for example, a send node 206, a one-way data link 205, and a receive node 204. The one-way data link 205 may comprise, for example, an optocoupler having an input coupled to the send node 206 and an output coupled to the receive node 204. In the alternative, one-way data link 205 may consist of discrete components such as an LED coupled to a photocoupler via an optical fiber, with the LED coupled to the send node 206 and the photocoupler coupled to the receive node 204. As with the FIG. 1 embodiment, the components are mounted on separate sides of boundary line 210, with the transmit-related devices mounted on the left side of boundary line 210 and the receive-related devices mounted on the right side of boundary line 210, and with the one-way data link 205 the only device which crosses boundary line 210 (and with no circuit board traces crossing boundary line 210). Boundary line 210 thus consists of an area of empty space on network interface card 200 between the area in which the transmit-side components mounted and the area in which the receive-side components mounted. As with the FIG. 1 embodiment, no electrical conductors pass across the area of empty space forming boundary line 210 such that the one-way data link is the only way to communicate from the transmit-side components to the receive-side components.

In operation, the network interface card 200 shown in FIG. 2 allows remote computers (not shown) to communicate with source CPU 207 via a network coupled to LAN interface 101, using the same type of communication methodologies discussed above with respect to network interface card 100, e.g., TCP/IP packet transfer, UDP packet transfer, DFTS, RFTS), SNTS, and RPTS, but in the reverse direction (since the ultimate destination for all information is the host computer). Source CPU 207, in turn, then transfers information (packets, files, etc.) across one-way transfer system 211 to destination CPU 202, which, in turn forwards such information to the host computer. Network interface card 200 ensures that information (packets, files, etc.) may only pass from source CPU 207 to destination CPU 202 and that no information or signals of any kind pass from destination CPU 202 to source CPU 207 (and onto the network coupled to LAN interface 101).

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A transmit-only network interface card for a host computer, comprising:
   a single printed circuit card configured to be mounted in the host computer;
   an Ethernet controller mounted on the single printed circuit card and coupled to the host computer via a host computer interface, the Ethernet controller having a network interface;
   a source processor mounted on the single printed circuit card, the source processor directly connected to the Ethernet controller network interface, the source processor configured to forward information received from the Ethernet controller network interface on a separate output;
   a one-way data link mounted on the single printed circuit card, the one-way data link having an input directly connected to the separate output of the source processor and an output, the one-way data link configured to transfer data only from the input of the one-way data link to the output of the one-way data link and to prevent any signal from passing from the output of the one-way data link to the input of the one-way data link; and
   a destination processor mounted on the single printed circuit card, the destination processor having an input directly connected to the output of the one-way data link and a network interface, the destination processor configured to forward information received on the input of the destination processor to a remote computer via the destination processor network interface.

2. The transmit-only network interface card of claim 1, further comprising an external power interface, wherein the destination processor is coupled to the external power interface to receive power such that the destination processor only receives power via the external power interface.

3. The transmit-only network interface card of claim 1, wherein the single printed circuit board has three separate contiguous areas, a first area containing the destination processor, a second area containing the Ethernet controller and the source processor and a third area disposed directly between the first area and the second area, the third area containing no electrical connections between the first area and the second area, the one-way data link spanning the third area with the input of the one-way data link within the second area and the output of the one-way data link within the first area.

4. A receive-only network interface card for a host computer, comprising:

a single printed circuit card configured to be mounted in the host computer;

an Ethernet controller mounted on the single printed circuit card and coupled to the host computer via a host computer interface, the Ethernet controller having a network interface;

a destination processor mounted on the single printed circuit card, the destination processor having a separate input and an output directly connected to the Ethernet controller network interface, the destination processor configured to forward information received on the separate input to the Ethernet controller network interface via the destination processor output;

a one-way data link mounted on the single printed circuit card, the one-way data link having an input and an output directly connected to the separate input of the destination processor, the one-way data link configured to transfer data only from the input of the one-way data link to the output of the one-way data link and to prevent any signal from passing from the output of the one-way data link to the input of the one-way data link; and a source processor mounted on the single printed circuit card, the source processor having a network interface and an output directly connected to the input of the one-way data link, the source processor configured to forward information received from a remote computer via the source processor network interface on the source processor output.

5. The receive-only network interface card of claim 4, further comprising an external power interface, wherein the source processor is coupled to the external power interface to receive power such that the source processor only receives power via the external power interface.

6. The receive-only network interface card of claim 5, wherein the single printed circuit board has three separate contiguous areas, a first area containing the source processor, a second area containing the Ethernet controller and the destination processor and a third area disposed directly between the first area and the second area, the third area containing no electrical connections between the first area and the second area, the one-way data link spanning the third area with the input of the one-way data link within the first area and the output of the one-way data link within the second area.

* * * * *